United States Patent [19]

Svanteson

[11] 4,038,184

[45] July 26, 1977

[54] METHOD OF PROCESSING WASTE ON SHIPS AND THE LIKE AND ARRANGEMENT FOR CARRYING OUT THE METHOD

[75] Inventor: Sven Elis Ake Svanteson, Bromma, Sweden

[73] Assignee: Aktiebolaget Electrolux, Stockholm, Sweden

[21] Appl. No.: 631,538

[22] Filed: Nov. 13, 1975

[30] Foreign Application Priority Data

Nov. 25, 1974  Sweden ................................. 7414795
Feb. 21, 1975  Sweden ................................. 7501974

[51] Int. Cl.² ............................................ B01D 1/14
[52] U.S. Cl. ......................................... 210/59; 159/8; 159/25 R; 201/7; 210/68; 210/71; 210/152; 210/178; 210/180; 241/17; 241/27
[58] Field of Search .................... 159/7, 8, 9 A, 25 R; 34/68, 182, 183; 201/7, 8; 209/152; 210/10, 12, 49, 56, 67, 68, 71, 73 S, 152, 167, 173, 59, 175–180, 187; 241/17, 23, 27, 46.17, 47, 188 R, 189 R

[56] References Cited

U.S. PATENT DOCUMENTS

| | | | |
|---|---|---|---|
| 2,131,711 | 9/1938 | Porteous | 210/56 |
| 2,460,008 | 1/1949 | Heller | 241/188 R |
| 2,595,831 | 5/1952 | De Nie et al. | 241/23 |
| 2,723,954 | 11/1955 | Young | 210/67 |
| 3,597,769 | 8/1971 | Brainard | 210/71 |
| 3,638,590 | 2/1972 | Roberts et al. | 210/67 |
| 3,642,135 | 2/1972 | Borden | 210/152 |
| 3,733,617 | 5/1973 | Bennett | 210/152 |
| 3,804,249 | 4/1974 | Gibbons et al. | 209/473 |

*Primary Examiner*—Thomas G. Wyse
*Assistant Examiner*—Peter A. Hruskoci
*Attorney, Agent, or Firm*—Alfred E. Miller

[57] ABSTRACT

A method and apparatus for treatment of waste on ships and the like, in the form of solid waste and black water collected in a tank from reduced flush toilets. The solid waste is mixed with black water from the tank in a drum. Rotating knives in the drum effect the disintegration of the solid waste, and also the picking up of the waste in the drum from the bottom thereof to permit it to drop repeatedly by gravity from the upper regions of the drum. A flow of hot air is passed through the drum and hence through the dropping mixed black water and disintegrated solid waste. The axis of the drum is substantially horizontal, and may be slightly inclined with bottom ridges to inhibit the flow of liquids therealong.

11 Claims, 2 Drawing Figures

METHOD OF PROCESSING WASTE ON SHIPS AND THE LIKE AND ARRANGEMENT FOR CARRYING OUT THE METHOD

BACKGROUND OF THE INVENTION

This invention relates to a method of processing waste on ships and the like, the waste being partly in the form of solid matter and partly in the form of black water coming from reduced-flush toilets and conveyed to and collected in a tank. The invention also relates to an arrangement for carrying out the method.

In the past, all waste from ships was, as a rule, discharged overboard without purification. However, due to the increasing emphasis on environmental protection, this practice can no longer be accepted, and new systems have been introduced with the object of neutralizing and storing the waste on the ship until it arrives in port, whence the waste is transferred ashore. Thus, for example, vacuum systems for sewage have been used in which the toilets are connected to a vacuum tank, so that the waste is conducted to a tank by vacuum force. This system has proved very satisfactory for handling black water, since only a small quantity of flush and transport liquid is required which can thus be collected in comparatively small space-saving tanks. This system has the additional advantage that it is not necessary to convey the water by gravity, so that the conduits can be placed at almost any desired location on the ship.

However, there are also other types of waste on ships and such refuse has been found to be difficult to take care of. Therefore, there is an urgent need for a more complete system which handles all waste on ships and if possible transforms it into a product which is easy to handle, odor-free and, if desired, sterile.

Briefly stated, this objective is achieved by the method according to the invention wherein the solid waste, after or during disintegration, is passed through a treatment zone is which it is caused to fall by gravity in a flow of hot air. The black water being conducted to the treatment zone and mixed with the solid, disintegrated waste, which thus serves as a carrier and an exposure surface for the black water in the hot-air flow. The hot-air flow evaporates all the liquid in the waste in the final part of the treatment zone, so that a dry product is obtained.

A preferred apparatus for performing the method includes a generally horizontal drum having an intake for heated air at one end and an outlet for this air at its opposite end. An inlet for solid waste, an inlet for liquid waste in the form of black water, and an outlet for dried waste are provided in the drum. A rotatable agitator is disposed in the drum to lift the waste from the bottom cause it to fall by gravity in the air flow.

In addition to the black water, waste on ships usually comprises what is generally called grey water, i.e. water from bath tubs, kitchen and lavatories. Further, waste is in the form of kitchen refuse, packings, such as paper, plastics products, can, etc., as well as oil, cargo spillings, paint, wood, saw dust, garbage, etc. All this refuse can be processed and transformed into a dry product according to the system of the invention.

The system does not take care of the whole quantity of liquid contained in the grey water, since its contents of polluting substances in grey water is small relative to its total quantity and thus can be discharged overboard without too much harm. The grey water can, however, be processed by a conventional purification method for recovering the solid particles, which are then introduced into the process with the solid waste.

The invention is particularly adapted to operate with so-called reduced-flush toilets and will not function with conventional toilets, in which the liquid quantity is too large to be handled in a practical manner.

In order that the invention will be more clearly understood, it will now be disclosed in greater detail with reference to the accompanying drawings, in which:

FIG. 1 is a simplified partially cross-sectional view of a waste processing system in accordance with the invention; and FIG. 2 is a cross-sectional view of the system of FIG. 1 taken along the lines II-II.

DESCRIPTION OF THE PREFERRED EMBODIMENT OF THE INVENTION

Figure 1:
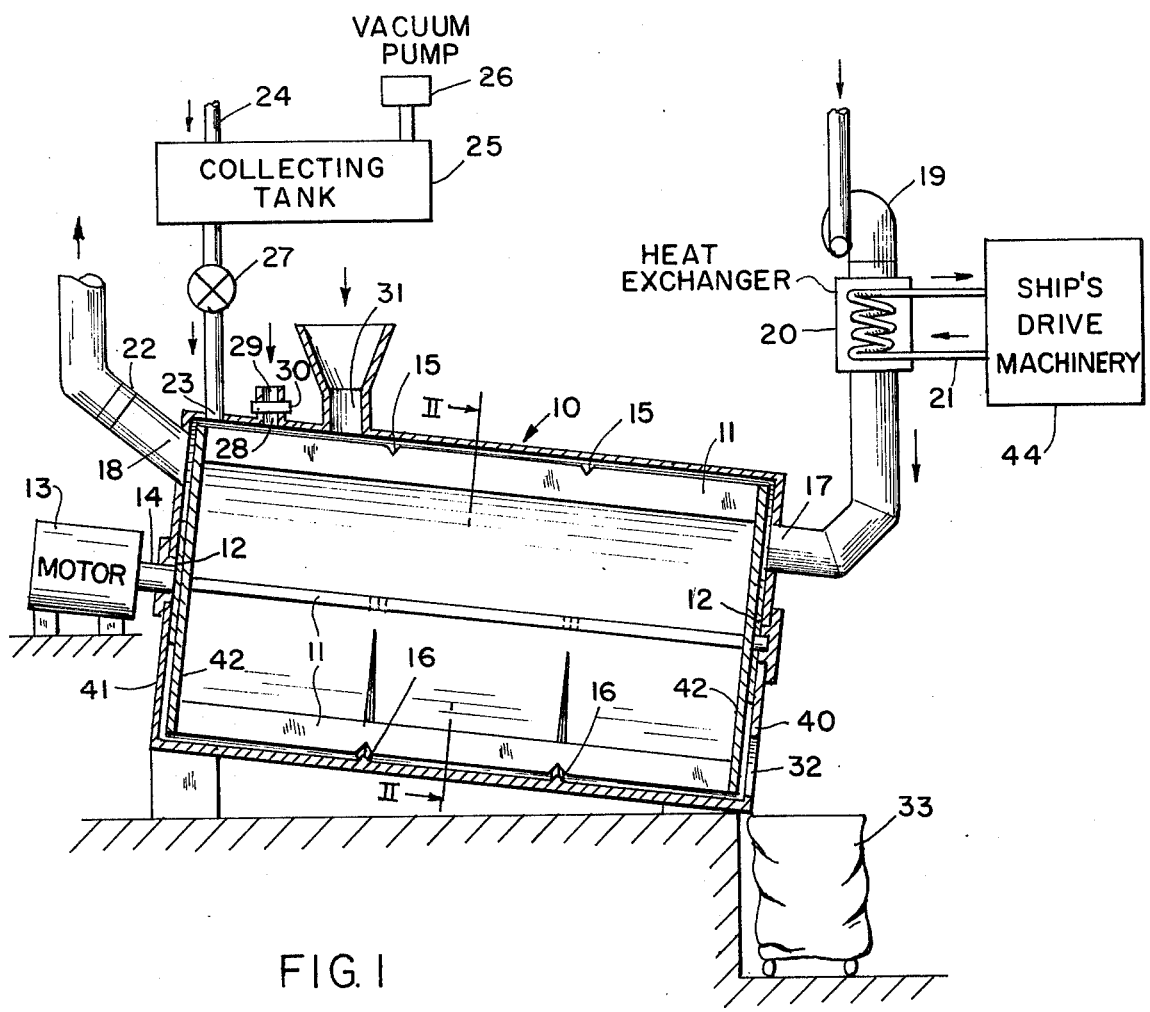

Referring now to the drawings, the system in accordance with the invention is comprised of a drum 10 having a substantially horizontal axis. While the axis of the drum may be exactly horizontal, it is preferable that it be inclined as illustrated in FIG. 1, for example at an angle of up to about 10°.

An agitator comprising knife-shaped, elongated elements 11 is supported by the ends 40, 41 of the drum. The ends of the elements 11 are connected to two plates 12 mounted for rotation in opposite ends of the drum for example, by being pivotally supported in the ends 40, 41 of the drum so that the plates can rotate, thus causing the elongated elements 11 to move over the inner surface of the drum. For this purpose, the ends of the elongated elements 11 may be affixed to plates 42 extending to the normal axis of the drum. These plates in turn are being affixed to the plates 12. The plates 42 and 12 thus support the elongated elements so that the latter moves against the inner surface of the drum 10, and about the axis of the drum.

Figure 2:
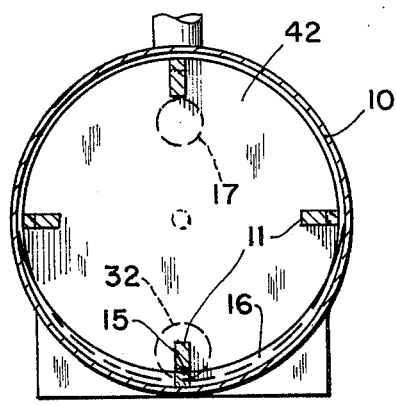

The agitator is driven by an electric motor 13 via a shaft 14 extending through a central hole in the end piece 41 and connected to the adjacent plate 12. Each element 11 has two V-shaped notches 15 axially aligned with separate projections 16 in the bottom of the drum. The projections 16 are designed to prevent liquid flowing axially over the bottom of the drum and may be arcuate as shown in FIG. 2.

In the upper portion of one end piece 40 of the drum is an intake 17 for heated air and in the upper portion of its other end piece 41 is an outlet 18 for this air. The outlet 18 may be exhausted to the atmosphere. Cold air is taken in by a fan 19 and is heated in a heat exchanger 20 communicating by conduits 21 with the cooling water system of the ship's drive machinery 44 by conventional techniques. Thus, surplus heat from the drive machinery is used to evaporate the liquid in the waste drum. The outlet 18 has a filter 22 preventing particles escaping to atmosphere. The drum has an inlet 23 at its upper portion adjacent the end piece 41 for black water which by way of a conduit 24, has been conveyed to a collecting tank 25 with the aid of a negative pressure generated in the tank by a vacuum pump 26. From the tank the black water is conducted via a valve 27 to the inlet 23 of the drum. The valve 27 opens the passage between the tank and the drum at regular intervals, either by manual or automatic control.

An inlet 28 for lime is also provided in the top of the drum. Lime must be measured in a dosing device 29 such as a cup, and admitted into the inlet 28 from the cup by a slide valve 30 operated either manually or automatically.

The drum also has an upper inlet 31 for solid waste which may, if desired, be disintegrated before entering the drum. If it has not been previously disintegrated, it will be cut up in the drum by the knife-shaped elements 11. When the elements 11 move over the inner surface of the drum solid and liquid waste and lime (if employed) are mixed. The solid waste is caused to fall by gravity from the upper part to the lower part of the drum in the hot-air flow. The liquid evaporates and the waste is transformed into a dry product which is discharged by an outlet 32 in the bottom of end piece 40, and emptied into a bag 33 or the like.

The arrangement operates in the following manner.

The disintegrated solid waste passes through the treatment zone, in the drum, to which also waste from the reduced-flush toilets is also fed. The last-mentioned waste is portioned into the treatment zone at suitable intervals, either by manual or automatic control of valve 27, and is mixed with the solid waste. This treatment is such that the exposure surface of the waste is increased during mixing. This is achieved by the fact that the waste is continuously caused to fall by gravity. During mixing, hot air is blown through the treatment zone and thus substantially all liquid evaporates and is entrained with the hot air and led out of the zone. The air should preferably have a temperature of about 70° C when entering the treatment zone. For the waste a temperature of about 70° C is desired in the final part of the treatment zone and about 60° C in the initial part of the zone and the apparatus is thus operated to maintain the waste in the drum a sufficient time to achieve these temperatures.

Thus, the solid waste in the treatment zone serves as a carrier and exposure surface for the liquid. Slaked lime is supplied to the waste either in the treatment zone or earlier. Thereby, compounds of fat in the waste will not form clods which prevent evaporation of the liquid. Instead, the fat compounds will saponify, and the waste when reaching the end of the zone is free of all liquid so that a dry, odorless and readily handled product is obtained. This dry product is collected in a container and can be compressed, if desired, and stored until the ship arrives in port, whence it is transferred for example to a refuse container. If desired, the dry product in the container can be disinfected by heating up to about 100° C.

It is evident that, in the above related process, particular types of waste, for example oil, paint, poisonous substances and the like, which might unfavorably affect possible later use of the waste, can be separately collected.

The invention is not limited to the method and the arrangement for carrying it out as above described but can be modified within the scope of the following claims.

While particular embodiments of the invention are herein illustrated and described, it will be understood that changes may be made in the construction and arrangement of elements without departing from the spirit or scope of the invention. Therefore, without limitation in this respect, the invention is defined by the following claims.

What is claimed is:

1. An apparatus for processing waste which has one part in the form of solid matter and another separate part in the form of black water collected in a tank from reduced-flush toilets; said apparatus comprising a stationary drum having a substantially horizontal axis, means in the upper portion of said drum for introducing heated air into one end of said drum, means in the upper portion of said drum for withdrawing air from the other end of said drum thereby causing a flow of heated air in said drum, means for introducing black water from said tank into said drum, means for introducing said solid matter into said drum, an outlet opening in the lower portion of said drum for removing dried waste, and a rotatable agitator in said drum mounted to lift waste from the bottom of the drum and drop waste lifted thereby to fall by gravity through said air flow said agitator comprising a plurality of elongated blades, rotatably mounted to move in said drum adjacent to the inner surface thereabout the longitudinal axis of said drum, said bottom of the drum being provided with circumferentially extending ridges directed radially inward, and said elongated blades having notches axially aligned with said ridges to disintegrate said solid matter.

2. The apparatus of claim 1 further comprising an inlet including a dosing device connected to introduce slaked lime into said drum.

3. The apparatus of claim 1 wherein said tank is a vacuum tank, and said means for introducing black water from said tank includes a valve.

4. The apparatus of claim 1 wherein the axis of said drum is inclined to the horizontal.

5. The apparatus of claim 4 wherein said other end of said drum is positioned above said one end with respect to the horizontal, said means for introducing the black water comprises an opening at the top of said drum adjacent to said other end, and said outlet opening is in said one end of said drum.

6. The apparatus of claim 1 for use on a ship having heat generating machinery, wherein said means for introducing heated air into said one end of said drum comprises heat exchanger means coupled to said heat generating machinery for heating air directed to said drum.

7. A method for processing waste having one part in the form of solid waste and another separate part in the form of black water collected in a tank from a reduced-flush toilet; said method comprising introducing said solid waste into a treatment zone, said treatment zone comprising a stationary drum having a substantially horizontal axis and a rotatable agitator, said agitator comprising a plurality of elongated blades having notches, rotatably mounted to move in said drum adjacent to the inner surface thereabout the longitudinal axis of said drum, the bottom of said drum being provided with circumferentially extending ridges directed radially inward, and said notches being axially aligned with said ridges, disintegrating said solid waste and raising said solid waste and dropping said solid waste by gravity in said treatment zone by rotating said blades, heating said solid waste by passing a flow of hot air through said dropping disintegrated waste in said treatment zone said flow being introduced into the upper portion of one end of said stationary drum and being withdrawn from the upper portion of the other end of said stationary drum, mixing said solid disintegrated waste with said black water in said treatment zone whereby said solid disintegrated waste serves as a carrier and an exposure surface for the black water in said hot air flow, continuing to rotate said blades and flow said hot air through said dropping solid disintegrated waste mixed with black water until substantially all waste in said treatment zone is a dry product, and removing said dry product from the bottom of said stationary drum.

8. The method of claim 7 further comprising supplying slaked lime to said treatment zone for mixing with said black water and solid disintegrated waste.

9. The method of claim 7 wherein said step of passing a flow of hot air comprises passing hot air through said treatment zone with a temperature and at a rate of flow whereby the waste in said treatment zone has a final temperture of about 70° C, and the temperature in the initial treatment portion of said treatment zone is about 60 60° C.

10. The method of claim 7 for use on a ship having a source of grey water with solid particles mixed therein, further comprising introducing solid particles separated from grey water into said treatment zone.

11. The method claim 7 for use on a ship having drive machinery producing heat, wherein said step of passing a flow of hot air comprises heating air to pass into said zone from heat generated by said machinery.

* * * * *

UNITED STATES PATENT OFFICE
CERTIFICATE OF CORRECTION

PATENT NO. : 4,038,184
DATED : July 26, 1977
INVENTOR(S) : SVEN ELIS AKE SVANTESON It is certified that error appears in the above-identified patent and that said Letters Patent are hereby corrected as shown below:

Column 5, line 10, correct the spelling of "temperature" first occurrence.

Column 6, line 2, cancel "60" first occurrence.

Signed and Sealed this

Third Day of January 1978

[SEAL]

Attest:

RUTH C. MASON
Attesting Officer

LUTRELLE F. PARKER
Acting Commissioner of Patents and Trademarks